United States Patent [19]

Bogdan

[11] Patent Number: 5,125,691
[45] Date of Patent: Jun. 30, 1992

[54] HIGH PRESSURE GAS PIPELINE HAVING CONCENTRIC TUBES AND VENT TUBES

[76] Inventor: Lazarevic Bogdan, Mose Pijade 124/17, 26000 Pancevo, Yugoslavia

[21] Appl. No.: 609,709

[22] Filed: Nov. 6, 1990

[30] Foreign Application Priority Data

Nov. 6, 1989 [YU] Yugoslavia .............................. 2120/89

[51] Int. Cl.⁵ ............................................. F16L 39/00
[52] U.S. Cl. ................................. 285/132; 285/133.1; 285/142; 285/153; 285/13; 285/133.2; 285/924; 166/89; 138/113; 138/114
[58] Field of Search ............... 285/133.1, 133.2, 137.2, 285/132, 140, 142, 143, 924, 153, 13, 41, 47, 53, 138, 45; 166/54.1, 89, 241; 62/55; 138/111, 113, 114, 104, 148

[56] References Cited

U.S. PATENT DOCUMENTS

| | | | |
|---|---|---|---|
| 1,587,441 | 6/1926 | Taylor | 166/89 |
| 1,849,374 | 2/1930 | McEvoy | 166/89 |
| 1,891,508 | 4/1931 | Stephens | 166/89 |
| 2,475,635 | 7/1949 | Parsons | 138/114 |
| 3,126,918 | 3/1962 | Eaton | 138/113 |
| 3,744,562 | 7/1973 | Priebe et al. | 166/89 |
| 4,011,732 | 3/1977 | Doherty et al. | 285/133.1 |

Primary Examiner—Randolph A. Reese
Assistant Examiner—Timothy Aberle
Attorney, Agent, or Firm—Richard C. Litman

[57] ABSTRACT

High pressure gas pipeline is intended for economic transportation of fluids in gaseous or liquid condition. The pipes are coaxially disposed, so that the first axial pipe 1 and the second axial pipe 2 are supported by the first ring 6 forming the first shell, while the third axial pipe 3 and the fourth axial pipe 4 are supported by the second ring 7 forming the second shell. Outer shell is the pipe shell 5 and it is retained on the second shell by the second supports 9, while the second shell is retained on the first shell by the first supports 8. The pipeline is secured from explosion in the way that the first shell is secured by the first discharge pipe 10, and the second shell is secured by the second discharge pipe 11, both of which are connected with the atmosphere. The discharge pipe passages through the shells are reinforced by discharge pipe reinforcement 12.

4 Claims, 1 Drawing Sheet

U.S. Patent
June 30, 1992
5,125,691
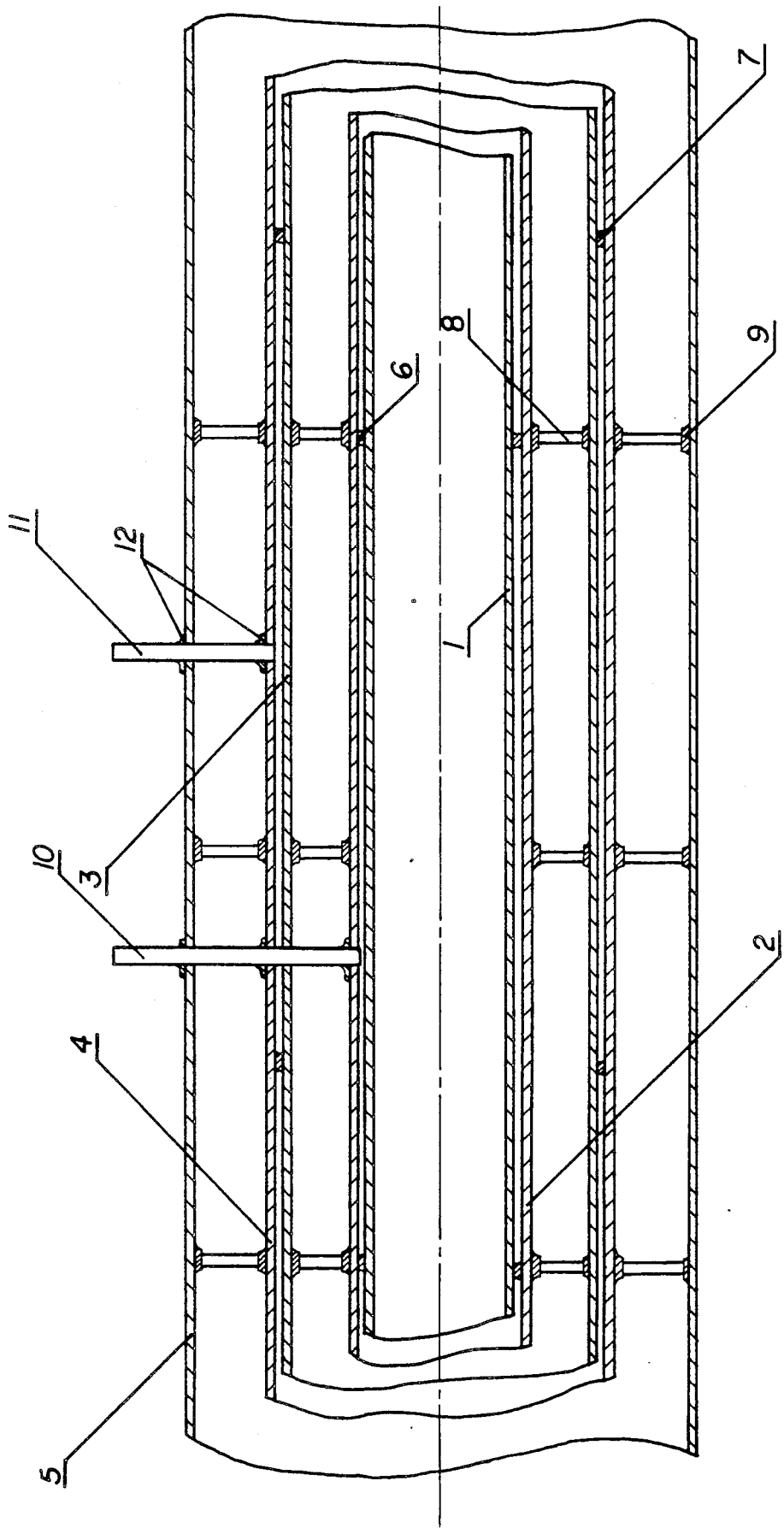

5,125,691

HIGH PRESSURE GAS PIPELINE HAVING CONCENTRIC TUBES AND VENT TUBES

FIELD OF TECHNOLOGY

Gas and product pipelines are used for fluid transportation in gaseous or liquid condition by the chemical and oil industries, as well as for metallurgical, energy-production and process industry purposes. Through international classification, gas pipelines are classified in these fields and can be designated.

TECHNICAL PROBLEM

Fluid transportation optimal criteria require higher fluid pressures in the pipes. Maximum shell thickness is limited by the production technology and pipeline diameter. Thus the technical problem is the optimal pipeline shell thickness for large flow quantities, i.e. high pressure fluid transportation.

PRIOR ART

Main pipelines for gas transportation work with pressures on the order of 50-100 bar (112-225 psi). For these pressures, pipes of various shell thicknesses for all diameters are manufactured. To date, pipelines of larger dimensions for high and very high pressures have not been developed. Accordingly, the present invention proposes an improved high pressure gas pipeline for the transportation of fluids in gaseous or liquid condition with a high rate of economy.

BRIEF DESCRIPTION OF THE DRAWING

The single drawing FIGURE comprises a side elevation, partly in section, of a gas pipeline according to the present invention.

DESCRIPTION OF THE PREFERRED EMBODIMENT

By this invention, there is provided a high pressure gas pipeline comprising a multi-shell pipe strong enough to resist high and very high gas and liquid pressures. The pipes are to be manufactured from quality steel with a high elastic limit and required materials for alloying in order to obtain sufficient resistance to corrosion.

The pipeline, generally designated P, will be seen to comprise a plurality of concentrically disposed fluid passageways including an inner passageway A, intermediat passageway B and an outer passageway C as provided by elongated inner, intermediate and outer shell members. As depicted in the illustrated representative section of the pipeline P, opposite ends of the passageways A, B and C are provided with unimpeded first and second end openings D and E, respectively. As shown, the diameters of the three passageways are progressively substantially larger, from the inner one A to the outer one C. With this construction, the resultant effective cross-sectional area of the three independent passageways will be significant, with each succeeding passageway defining an area at least twice that of the next smaller diameter passageway. In this manner, large volumes of fluids may be transported through any one or all of the passageways of the pipeline P with minimal turbulence.

The following elements can be seen on the drawing: (1) first axial pipe, (2) second axial pipe, (3) third axial pipe, (4) fourth axial pipe, (5) pipe shell, (6) first ring, (7) second ring, (8) first support, (9) second support, (10) first discharge pipe, (11) second discharge pipe, (12) discharge pipe reinforcement.

The first axial pipe 1 and second axial pipe 2 are lined coaxially at distance equal to first ring 6 thickness forming the first carrying shell. Third axial pipe 3 and fourth axial pipe are lined at distance equal to second ring 7 thickness, forming the second carrying shell. Pipe shell 5 lies coaxially to the second shell supported by second supports 9. The second shell also lies coaxially to the first shell supported by the first supports 8. The first discharge pipe or conduit 10 connects the gap between the first axial pipe 1 and the second axial pipe 2 with the atmosphere, while the second discharge pipe or conduit 11 connects the gap between the third axial pipe 3 and the fourth axial pipe 4 with the atmosphere. Discharge pipe reinforcements 12 reinforce the passages of discharge pipes through the shells. The compressed fluid in gaseous or liquid condition is being transported through the section and coaxial sections of pipe of the first shell, the first and the second shell, and the second shell and pipe shell 5. Radial pressures on the shells are approximately equal, having opposite directions, and deformations for first ring 6 and second ring 7 thicknesses are possible. The first supports 8 and the second supports 9 are radial gratings and do not effect a significant resistance to fluid flow. The axially spaced pairs of rings 6—6 and 7—7 provide buffer zones F and G respectively communicating with the discharge conduits 10 and 11.

Due to the possibility of material defectiveness and imperfect sealing of welded joints, the first 10 and the second 11 discharge pipes secure the shells from explosion. Pipe shell 5 bears the fluid pressure at the characteristic diameter which is significantly more favorable than geometrical diameter. Axial thrust is being transmitted to the shells proportionally to characteristic diameters of each shell. These stresses must not exceed permitted limits. All standards developed for convénient gas pipelines can also be applied to high pressure gas pipeline. Certain gases become liquid when submitted to high pressure and can be transported extremely economically, i.e. like liquids. The number of axial pipes can be chosen and the gas pipeline construction is thus being optimized in the best manner.

The present pipeline is assembled by constructing the first axial pipe 1 and coaxially constructing the second axial pipe 2, along with mounting of the first rings 6. Then, the first supports 8 are installed and the third axial pipe is constructed, followed by the fourth axial pipe with the second rings 7. Thereafter, the second supports 9 and the pipe shell 5 are installed. Assuming that the dimensions of the gap between the shells is sufficient, the passages through the shells are made and the first 10 and second 11 discharge pipes are welded in position and reinforced by reinforcements 12. The thus constructed pipeline is then ready for placing upon suitable supports.

I claim:

1. A high pressure pipeline for the independent transport of a plurality of fluids comprising;
a plurality of concentrically disposed elongated members defining inner, intermediate and outer shell members, each of said shell members providing a fluid passageway having substantially unimpeded first and second end openings,
said inner shell member comprising a first axial pipe forming therein said inner passageway, a second axial pipe closely surrounding said first axial pipe and defining an annulus therebetween, a pair of axially spaced apart first ring elements disposed in said annulus and securing together said first and second pipes with adjacent ones of said first ring elements defining a first buffer zone therebetween, said intermediate shell member comprising a third axial pipe forming therein said intermediate passageway, a plurality of axially spaced apart radially projecting first supports within said intermediate passageway joining said third axial pipe to said second axial pipe, a fourth axial pipe closely surrounding said third axial pipe and defining an annulus therebetween, a pair of axially spaced apart second ring elements disposed in said annulus and securing together said third and fourth pipes with adjacent ones of said second ring elements defining a second buffer zone therebetween, said outer shell member comprising a fifth axial pipe forming therein said outer passageway, a plurality of axially spaced apart radially projecting second supports within said outer passageway joining said fifth axial pipe to said fourth axial pipe, first vent discharge conduit means extending to, in fluid communication with, and terminating at said first buffer zone for relief of pressure therein, and extending through said outer and intermediate passageways and having opposite ends respectively communicating from exteriorly of said fifth axial pipe to said first buffer zone, and second vent discharge conduit means extending to, in fluid communication with, and terminating at said second buffer zone for relief of pressure therein, and extending through said outer passageway and having opposite ends respectively communicating from exteriorly of said fifth axial pipe to said second buffer zone, whereby fluid under separate or identical pressures is simultaneously transportable through said inner, intermediate and outer passageways while distortion of or leakage through any of said first, second, third or fourth axial pipes is accommodated by and relieved through said first and second discharge conduits communicating with said first and second buffer zones.

2. A high pressure pipeline according to claim 1 wherein,
said first and second discharge conduits are radially disposed.

3. A high pressure pipeline according to claim 1 wherein, said first and second supports comprise gratings.

4. A high pressure pipeline according to claim 1 including, reinforcement means securing said first and second discharge conduits each to a plurality of said pipes.

* * * * *